United States Patent Office

3,092,628
ALDOSTERONE ANTAGONISTS

Arthur E. Oberster, Garwood, Roger E. Beyler, Westfield, and Lewis H. Sarett, Princeton, N.J., assignors to Merck & Co., Inc., Rahway, N.J., a corporation of New Jersey
No Drawing. Filed May 29, 1959, Ser. No. 816,693
1 Claim. (Cl. 260—239.57)

This invention relates to steroids having aldosterone antagonist activity, to intermediates prepared in the formation of the same, and to processes for making the novel aldosterone antagonists.

Aldosterone is a powerful agent for maintaining electrolyte balance in adrenalectomized patients and in patients suffering from adrenal hypofunction. Aldosterone promotes water retention and retention of sodium and chloride ions and tends to promote excretion of potassium. Over-secretion of aldosterone can therefore be seen to cause electrolyte imbalance. It is therefore necessary in those cases to administer an aldosterone antagonist in order to restore the balance.

The aldosterone antagonist compounds of this invention have a general formula selected from the group consisting of

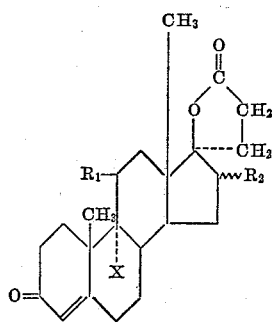

and

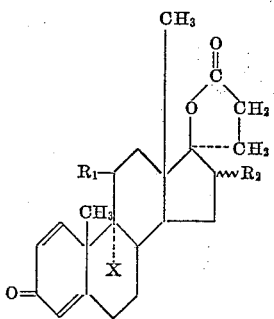

where $R_1$ is selected from the group consisting of β-hydroxyl and oxo, $R_2$ is a lower alkyl radical, and X is selected from the group consisting of hydrogen fluorine, chlorine and bromine.

Other novel aldosterone antagonists have a general formula of the group consisting of

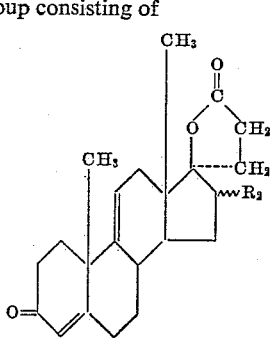

and

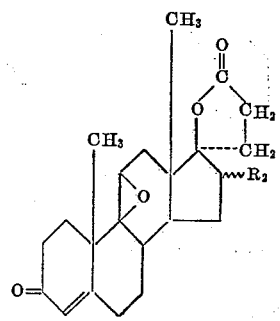

where $R_2$ is as previously defined. These compounds are also especially useful in forming 9α-halo compounds of this invention.

The process of this invention may be illustrated with respect to the formation of 3-(17β-hydroxy-16α-methyl-3,11-dioxo-4-androsten-17α-yl)propionic acid gamma-lactone from 3α,17α-dihydroxy-16α-methyl-11,20-pregnanedione. This process proceeds according to the flow sheet below:

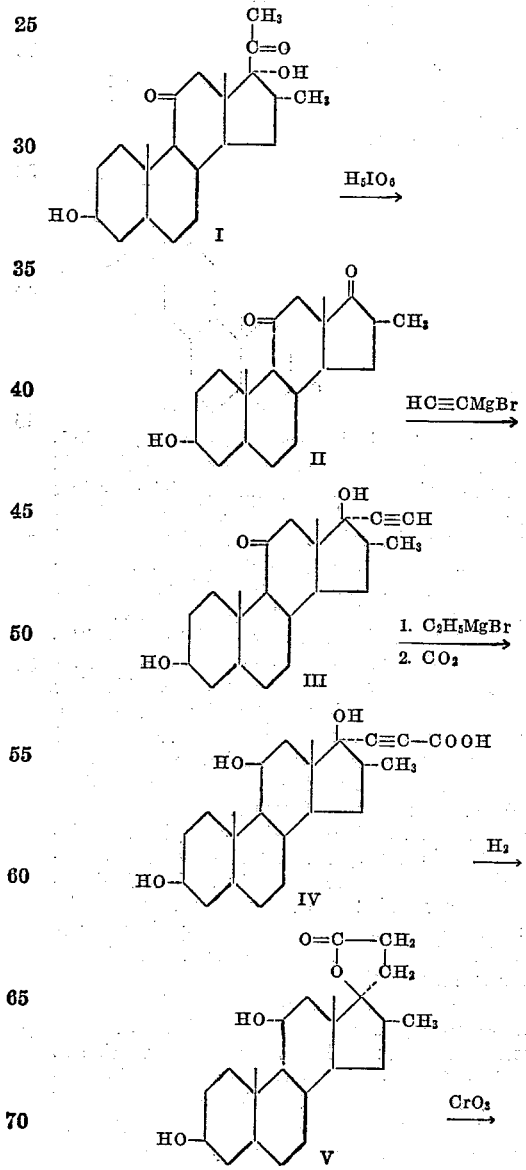

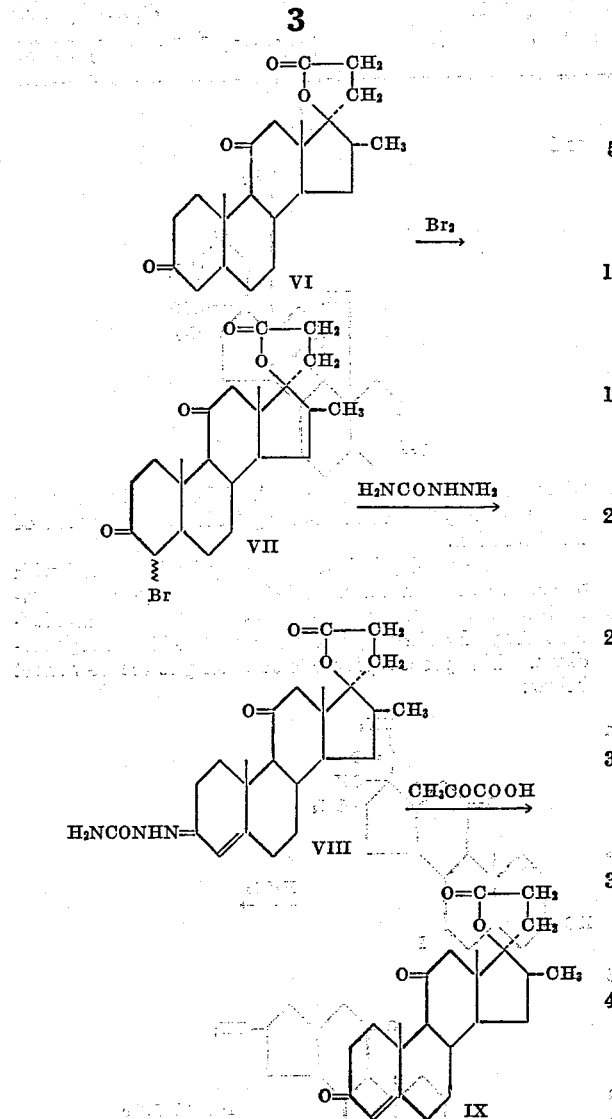

gamma-lactone (V). This reaction can also be carried out using lithium and ammonia in lieu of hydrogen in the presence of a catalyst.

The compound 3-(3α,11β,17β-trihydroxy-16α-methyl-etiocholan-17α-yl)propionic acid gamma-lactone (V) is oxidized with chromium trioxide to form 3-(17β-hydroxy-16α - methyl - 3,11 - dioxoetiocholan - 17α - yl)propionic acid gamma-lactone (VI).

The compound 3-(17β-hydroxy-16α-methyl-3,11-dioxoetiocholan-17α-yl)propionic acid gamma-lactone (VI) is reacted with one mole of bromine to form 3-(4-bromo-17β - hydroxy - 16α - methyl - 3,11 - dioxoetiocholan-17α-yl)propionic acid gamma-lactone (VII). Reaction of this compound with semicarbazide results in the formation of 3 - (17β - hydroxy - 16α - methyl - 11 - oxo - 3-semicarbazido-4-androsten-17α-yl)-propionic acid gamma-lactone (VIII). Removal of the 3-semicarbazide group can be accomplished by means such as hydrolysis in an aqueous mixture of pyruvic acid and acetic acid, thereby forming the aldosterone antagonist 3-(17β-hydroxy - 16α - methyl - 3,11 - dioxo - 4 - androsten - 17α-yl)propionic acid gamma-lactone (IX).

The aldosterone antagonist 3-(11β,17β,dihydroxy-16α-methyl - 3 - oxo - 4 - androsten - 17α - yl)propionic acid gamma-lactone (XI) can be prepared from 3-(17β-hydroxy - 16α - methyl - 11 - oxo - 3 - semicarbazido - 4-androsten-17α-yl)propionic acid gamma-lactone (VIII), the preparation of which has been previously described, by reaction with sodium borohydride or other suitable reducing agent, thereby forming 3-(11β,17β-dihydroxy-16α-methyl - 3 - semicarbazido - 4 - androsten - 17α - yl)propionic acid gamma-lactone (X) which is hydrolyzed, for example with pyruvic acid in aqueous acetic acid, to form 3 - (11β,17β - dihydroxy - 16α - methyl - 3 - oxo-4-androsten-17α-yl)propionic acid gamma-lactone (XI). This conversion is illustrated as follows:

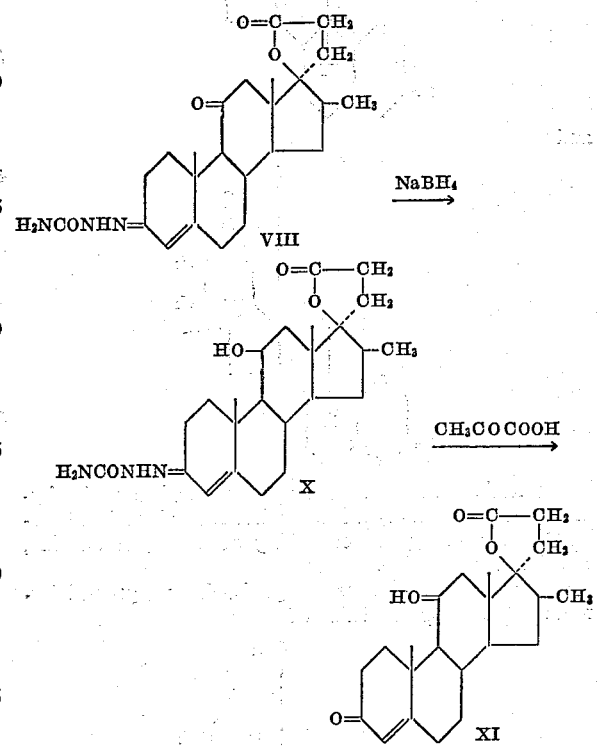

The starting material 3α,17α-dihydroxy-16α-methyl-11,20-pregnanedione (I) is reacted with periodic acid in aqueous methanol at room temperature. The product 3α-hydroxy-16α-methyl-11,17-etiocholanedione (II) is recovered from the reaction mixture by extraction with ethyl acetane followed by chromatography on a suitable adsorbent such as alumina. This compound is reacted with acetylenemagnesium bromide in tetrahydrofuran to form a Grignard complex, which is hydrolyzed to form 17α-ethynyl - 3α,17β - dihydroxy - 16α - methyl - 11 - etiocholanone III. The acetylenemagnesium bromide, which has the formula HC≡CMgBr, is prepared by first making ethylmagnesium bromide according to the conventional procedure of adding excess ethyl bromide to magnesium in tetrahydrofuran, and then adding the ethylmagnesium bromide solution to a saturated solution of acetylene in tetrahydrofuran. The 3α-hydroxy-16α-methyl-11,17-etiocholanedione (II) in tetrahydrofuran is added to the acetylenemagnesium bromide solution and acetylene is thereafter continuously bubbled into the solution. When the reaction is complete, the acetylene is stopped, water is added, and the mixture after filtration is extracted with ethyl acetate to recover the product.

The product 17α-ethynyl-3α,17β-dihydroxy-16α-methyl-11-etiocholanone (III) of the previous step is reacted with ethylmagnesium bromide, followed by carbon dioxide to form 3 - (3α,11β,17β - trihydroxy - 16α - methyl - etiocholan-17α-yl)-2-propynoic acid (IV). This compound is catalytically hydrogenated to form 3-(3α,11β,17β-trihydroxy - 16α - methyletiocholan - 17α - yl)propionic acid The 9α-fluoro compounds of the present invention may be formed according to the following sequence of reactions:

The compound 3-(11β,17β-dihydroxy-16α-methyl-3-oxo-4-androsten-17α-yl)propionic acid gamma-lactone (XI) is reacted with methanesulfonyl chloride or p-toluenesulfonyl chloride to form 3-[17β-hydroxy-16α-methyl-3-oxo - 4,9(11) - androstadien - 17α - yl]propionic acid gamma-lactone (XII), which is reacted with a reagent which furnishes hypobromous acid in solution, as for example N-bromosuccinimide, thereby forming 3-(9α-bromo - 11β,17β - dihydroxy - 16α - methyl - 3 - oxo - 4-androsten-17α-yl)propionic acid gamma-lactone (XIII). Reaction of this compound with an alkaline reagent such as potassium carbonate yields 3-(9β,11β-epoxy-17β-hydroxy - 16α - methyl - 3 - oxo - 4 - androsten - 17α - yl) propionic acid gamma-lactone (XIV). This compound, when reacted with hydrofluoric or hydrochloric acid, yields 3-(9α-fluoro-11β,17β-dihydroxy-16α-methyl-3-oxo-4-androsten-17α-yl)propionic acid gamma-lactone (XV), or 3 - (9α - chloro - 11β,17β - dihydroxy - 16α -methyl-3-oxo-4-androsten-17α-yl)propionic acid gamma-lactone respectively, which are novel active aldosterone antagonists. These compounds can be oxidized with chromic anhydride to form 3-(9α-fluoro-17β-hydroxy-16α-methyl-3,11-dioxo-4-androsten-17α-yl)propionic acid gamma-lactone (XVI), and 3-(9α-chloro-17β-hydroxy-16α-methyl-3,11-dioxo-4-androsten-17α-yl)-propionic acid gamma-lactone respectively, which are also novel aldosterone antagonists.

Preparation of the 9α-fluoro compounds may be illustrated as follows:

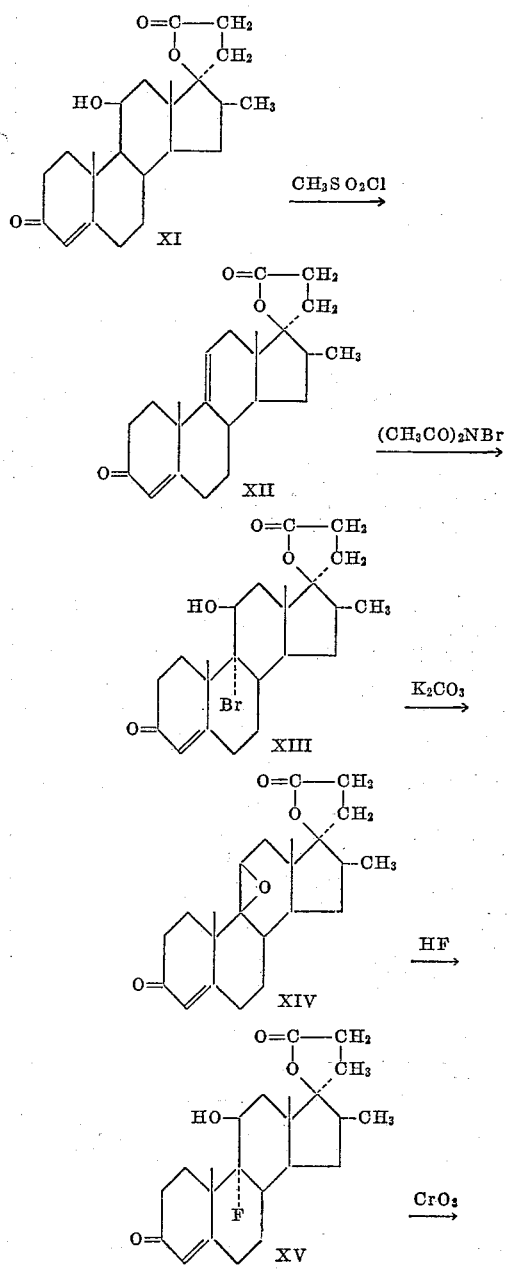

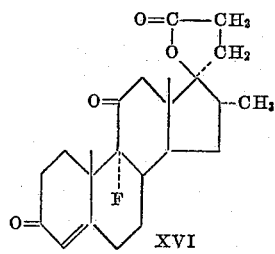

The 9α-chloro compounds are made in the same way, substituting hydrogen chloride for hydrogen fluoride in the reaction with the 9,11-epoxy compound (XIV).

Aldosterone antagonists having the 1,4-conjugated diene structure in the A-ring can also be prepared according to this invention. For example 3-(17β-hydroxy-16α-methyl-3,11-dioxo-4-androsten-17α-yl)propionic acid gamma-lactone (IX) can be dehydrogenated at the 1 and 2 positions by various known means such as reaction with selenium dioxide or microbial dehydrogenation with microorganisms of the species Bacillus sphaericus, thereby affording the novel aldosterone antagonist 3-(17β-hydroxy-16α-methyl-3,11-dioxo-1,4-androstadien-17α-yl)propionic acid gamma-lactone (XVII), which can be reduced if desired with an equivalent quantity of sodium borohydride to 3-(11β,17β - dihydroxy - 16α - methyl - 3 - oxo - 1,4-androstadien - 17α - yl)propionic acid gamma-lactone (XVIII). This transformation is indicated by the following equation:

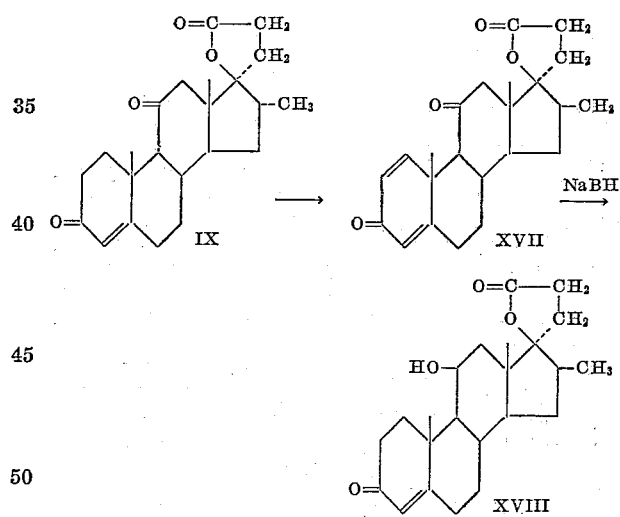

The corresponding 9α-fluoro compounds, i.e. 3-(9α-fluoro-17β-hydroxy - 16α - methyl-3,11-dioxo-1,4-androstadien-17α-yl)propionic acid gamma-lactone and 3-(9α-fluoro - 11β,17β - dihydroxy-16α-methyl-3-oxo-1,4-androstadien-17α-yl)propionic acid gamma-lactone can be formed in the same way from 3-(9α-fluoro-17β-hydroxy-16α-methyl-3,11-dioxo-4-androsten-17α-yl)propionic acid gamma-lactone (XVI).

The foregoing equations and reagents represent preferred embodiments of the invention for formation of novel compounds of the 16α-lower alkyl series. Other reagents than those indicated may be used as is evident from the foregoing portion of the specification. Lower alkyl substituents other than methyl at the 16α-position may also be introduced as will be evident to those skilled in the art.

In addition to the 16α-methyl compounds illustrated above, 16β-lower alkyl compounds and particularly 16β-methyl compounds can be formed according to this invention using the procedures illustrated in the foregoing equations starting with 3α,17α-dihydroxy-16β-methyl-11,20-pregnane-dione, which is the 16β-methyl epimer of compound I. Novel aldosterone antagonists which can be thus formed include 3-(17β-hydroxy-16β-methyl-3,11-dioxo-4-androsten-17α-yl)propionic acid gamma-lactone, 3-(11β,17β-dihydroxy - 16β - methyl-3-oxo-4-androsten-17α-yl)propionic acid gamma-lactone, 3-(9α-fluoro-11β,17β-dihydroxy-16β-methyl-3-oxo-4-androsten - 17α - yl)propionic acid gamma-lactone, 3-(9α-fluoro-17β-hydroxy-16β-methyl-3,11-dioxo-4-androsten-17α-yl)propionic acid gamma-lactone, 3-(17β-hydroxy-16β-methyl - 3,11 - dioxo-1,4-androstadien-17α-yl)propionic acid gamma-lactone, 3-(11β,17β-dihydroxy - 16β - methyl-3-oxo-1,4-androstadien-17α-yl)propionic acid gamma-lactone, 3-(9α-fluoro-11β,17β-dihydroxy-16β-methyl-3-oxo - 1,4 - androstadien-17α-yl)propionic acid gamma-lactone, 3-(9α-fluoro-17β-hydroxy-16β - methyl-3,11-dioxo-1,4-androstadien - 17α - yl)propionic acid gamma-lactone, and the 16β-lower alkyl homologs thereof.

The preparation of the starting material 3α,17α-dihydroxy-16a-methyl - 11,20 - pregnanedione (I) from the known compound 3-acetoxy-16-pregnene-11,20-dione can be carried out as follows:

A solution of 10.22 g. of methyl iodide in 50 ml. of ether is added to 1.73 g. of magnesium in 50 ml. of ether. To the resulting ethereal solution of methyl magnesium iodide, maintained under a nitrogen atmosphere, is added 0.045 g. of anhydrous cuprous chloride. To this mixture is added, over a period of about one hour, during which period the reaction mixture is stirred vigorously and maintained at approximately room temperature, a solution of about 5.6 g. of 3-acetoxy-16-pregnene-11,20-dione in 175 ml. of ether. A white granular solid separates during this addition. The resulting mixture is heated under gentle reflux for two hours after which the reaction mixture is cooled, and 125 ml. of saturated aqueous ammonium chloride solution is added followed by 200 ml. of ether. The layers are separated, and the ethereal layer is washed with three 50 ml. portions of water. The washed ethereal layer is dried, and the solvent evaporated in vacuo to give a brown viscous oil. This oil, which is essentially 3α-hydroxy-16α-methyl-11,20-pregnanedione, is heated for 15 minutes at 60°–70° C. with a mixture of 25 ml. of pyridine and acetic anhydride. The acetylated product is purified by chromatography on acid-washed alumina followed by crystallization from petroleum ether to give approximately 1.5 g. of substantially pure 3-acetoxy-16α-methyl-11,20-pregnanedione.

A solution of 22 g. of 3α-acetoxy-16α-methyl-11,20-pregnanedione and 1 g. of p-toluene sulfonic acid in 250 ml. of acetic anhydride is heated at reflux under nitrogen for a period of approximately three days. Two grams of anhydrous potassium acetate is added, and the volatile solvents are separated by distillation in vacuo. The residual material is extracted with benzene, and the benzene extract is filtered to remove insoluble material. The benzene extracts are evaporated to a volume of 100 ml. and petroleum ether is added to the cloud point. The resulting solution is absorbed on 660 g. of acid-washed alumina, the alumina adsorbate is then washed with 2 liters of petroleum ether. The adsorbate is then eluted with 85:15 petroleum ether-ether mixture, and the first four liters of elute is collected, and evaporated to dryness in vacuo to give a mixture of enol acetates containing 3α,20-diacetoxy-16α-methyl-17(20)-pregnene-11-one. This mixture of enolates, weighing approximately 14 g., is dissolved in 50 ml. of benzene and treated with an excess of perbenzoic acid over a 16-hour period. The reaction mixture is shaken with dilute aqueous potassium hydroxide solution until the benzene layer is free of perbenzoic acid; the benzene layer is then washed with water until neutral, dried, and the solvent evaporated in vacuo to give a crystalline material, 3α,21-diacetoxy - 17α,20 - epoxy-16α-methyl-11-pregnanone. The latter material is dissolved, without purification, in 200 ml. of methanol, 120 ml. of water, and 10 g. of potassium bicarbonate; and the resulting solution is heated at reflux under nitrogen for a period of 16 hours. The methanol is evaporated from the hydrolysis solution in vacuo, and the residual oil is extracted from the resulting aqueous solution with chloroform. The chloroform extract is washed with water to neutrality, dried, and the chloroform is evaporated under reduced pressure. The residual oil is triturated with ether, and the crystalline material thus formed is recrystallized from ethyl acetate-petroleum ether to give 3α,17α-dihydroxy-16α-methyl-11,20-pregnanedione (I).

The 16-lower alkyl homologs of (I) can be prepared by substituting the appropriate lower alkyl iodide for methyl iodide in the above procedure.

The starting material 3α,17α-dihydroxy-16β-methyl-11,20-pregnanedione can also be prepared from the known compound 3α-acetoxy-16-pregnene-11,20-dione. A procedure for carrying out this synthesis is as follows:

In a 500 ml. three-necked flask equipped with condenser, dropping funnel and nitrogen inlet are placed 20 g. of potassium hydroxide in 90 ml. of water, 100 ml. of methanol, and 100 ml. of ether. A solution of 10 g. of N-methyl-N-nitroso-p-toluenesulfonamide in 50 ml. of ether is placed in the dropping funnel. Diazomethane is generated by warming the flask to 40° to 45° C. and continuously adding the N-methyl-N-nitroso-p-toluenesulfonamide solution from the dropping funnel. Nitrogen is utilized to sweep the diazomethane into a solution of 20 g. of 3α-acetoxy-16-pregnene-11,20-dione in 100 ml. of tetrahydrofuran and 120 ml. of ether. The process is continued until the steroid solution remains yellow for several hours. The product, 3α-acetoxy-16α,17α-methyleneazo-11,20-pregnanedione, largely precipitates from the reaction mixture. After 16 hours the mixture is filtered, washed with ether and dried in air; M.P. 186°–190° C. (decomposes).

Diazoethane, diazopropane, or the like is substituted in the above step for diazomethane where a 16β-lower alkyl homolog of 3α-acetoxy-16β-methyl-11,20-pregnanedione is to be produced.

Into a 500 ml. round-bottomed flask heated by an oil bath is placed 37.4 g. of 3α-acetoxy-16α,17α-methyleneazo-11,20-pregnanedione. A manometer and a 12-liter surge flask are in the line between the reaction flask and the vacuum pump trap. The flask contents are heated in vacuo at an initial pressure of 0.6 mm. until the bath temperature reaches 180° C. The maximum pressure developed is about 83 mm. After 10 minutes at 180° to 182° C. the melt is cooled. The product, which has

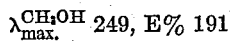
$\lambda_{max.}^{CH_3OH}$ 249, E% 191 is taken up in about 150 ml. of acetone, filtered through diatomaceous earth and concentrated to about 100 ml. while ether is slowly added to the boiling solution until crystallization occurs. These crystals were 3α-acetoxy-16-methyl-16-pregnene-11,20-dione; M.P. 165° to 167° C.,

$(\alpha)_D^{CHCl_3}$ +75°, $\lambda_{max.}^{CH_3OH}$ 249, $E_m$ 9300

To a solution of 200 mg. of 3α-acetoxy-16-methyl-16-pregnene-11,20-dione in 20 ml. of methanol is added 200 mg. of 25% palladium on a calcium carbonate catalyst. The mixture is stirred in hydrogen at atmospheric pressure and a temperature of 25° C. until hydrogen uptake is complete. The mixture is filtered, the filtrate evaporated to dryness, and the residue crystallized to form ether-hexane to give needles of pure 3α-acetoxy-16β-methyl,11,20-pregnanedione; M.P. 160° to 163° C.,

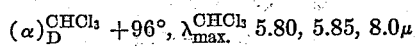
$(\alpha)_D^{CHCl_3}$ +96°, $\lambda_{max.}^{CHCl_3}$ 5.80, 5.85, 8.0μ

To a stirred solution of 1.63 g. of 3α-acetoxy-16β-methyl-11,20-pregnanedione in 5 ml. of chloroform and 25 ml. of carbon tetrachloride cooled to 0° C. is added a mixture of 2.60 ml. of cold acetic anhydride and 0.13 ml. of 60% perchloric acid. This mixture is held at 25° C. for two hours and then at 0° C. for 17 hours, and then is successively washed with cold 5% aqueous sodium carbonate and cold water, and dried over sodium sulfate. The solvents are removed in vacuo, leaving a colorless residue of 3α,20-diacetoxy-16β-methyl-17(20)pregnene-11-one;

$\lambda_{max}.$ 5.75, 5.85, 8.0μ

To 1.86 g. of 3α,20-diacetoxy-16β-methyl-17(20)-pregnene-11-one and 3 ml. of benzene is added 25 ml. of 2.5 M perbenzoic acid in benzene. After 16 hours at 25° C. uptake of perbenzoic acid is complete. Additional benzene and ether are added, and the mixture washed with aqueous sodium sulfite, sodium carbonate, and water. The organic layer is dried over sodium sulfate and taken to dryness to yield 3α,20-diacetoxy-17,20-epoxy-16β-methyl-11-pregnanone. This compound is dissolved in 70 ml. of ethanol, and 1.20 g. of sodium hydroxide in 35 ml. of water is added. After two hours at 25° C., 4 ml. of acetic acid is added and the mixture concentrated to a small volume in vacuo. Chloroform and water are added. The chloroform layer is washed with aqueous potassium bicarbonate, saturated with sodium chloride, and dried over magnesium sulfate. Removal of the solvents in vacuo and successive crystallization from acetone-ether and benzene-ethyl acetate give pure 3α,17α-dihydroxy-16β-methyl-11,20-prepnanedione; M.P. 192° to 197° C.;

$(\alpha)_D^{CHCl_3}$ +67°; $\lambda_{max.}^{Nujol}$ 2.90–3.05, 5.85–5.90μ

*Analysis.*—Found: C, 72.97; H, 9.95.

This invention will now be described in detail with reference to specific examples thereof:

EXAMPLE 1

*3α-Hydroxy-16α-Methyl-11,17-Etiocholanedione*

To 2 g. of 3α,17α,dihydroxy-16α-methyl-11,20-pregnanedione (I) in 40 ml. of methanol is added 5.9 g. of periodic acid, H5IO6, in 4.8 ml. of water. The resulting homogeneous solution was allowed to stand 65 hours at room temperature. The reaction mixture was worked up by adding water and extracting twice with ethyl acetate. The ethyl acetate extract was washed with aqueous sodium bicarbonate and then with water until neutral and dried over anhydrous sodium sulfate. The crude product weighed 1.767 g. This product was chromatographed on a column of acid-washed alumina. The column was eluted with ether-chloroform mixtures starting with pure chloroform and increasing the amount of ether in increments of 10% of the total mixture. The product 3α-hydroxy-16α-methyl-11,17-etiocholanedione (II) was recovered from the fractions containing 80% chloroform and 20% ether. The product was recrystallized from ether-methylene chloride. M.P. 159°–162° C.;

$\lambda_{max.}^{CHCl_3}$ 2.8, 5.69, 5.81μ

*Analysis.*—Calculated: C, 75.43%; H, 9.50%. Found: C, 75.00%; H, 9.40%.

EXAMPLE 2

*17α-Ethynyl-3α,17β-Dihydroxy-16α-Methyl-11-Etiocholanone*

To 1.02 g. of magnesium in 24 ml. of tetrahydrofuran was added excess ethyl bromide until all the magnesium disappeared. The ethylmagnesium bromide was transferred under pressure in a nitrogen atmosphere to a dropping funnel and was added dropwise over a two-hour period to 30 ml. of tetrahydrofuran saturated with acetylene. To this solution was added 300 mg. of 3α-hydroxy-16α-methyl-11,17-etiocholanedione (II) in 5 ml. of tetrahydrofuran over a 20-minute period. Acetylene was continuously bubbled through the solution overnight. Water was added until a gelatinous precipitate appeared. The mixture was filtered through "Supercel" (diatomaceous earth) and the filtrate was extracted with ethyl acetate. The ethyl acetate extract was washed with water until neutral, dried over anhydrous sodium sulfate and concentrated. A crude product weighing 320 mg. was obtained. Recrystallization from acetone yielded pure 17α-ethynyl-3α, 17β-dihydroxy-16α-methyl - 11 - etiocholanone (III). M.P. 244°–247° C.

$\lambda_{max.}^{Nujol}$ 2.81μ, 2.95μ, 5.81μ

*Analysis.*—Calculated: C, 76.70%; H, 9.36%. Found: C, 76.44%; H, 9.11%.

EXAMPLE 3

*3-(3α,11β,17β-Trihydroxy-16α-Methyletiocholan-17α-Yl)-2-Propynoic Acid*

To 6.0 g. of magnesium in 400 ml. of tetrahydrofuran was added ethyl bromide until all the magnesium was consumed. A solution of 4 g. of 17α-ethynyl-3α,17β-dihydroxy-16α-methyl-11-etiocholanone (III) in 50 ml. of tetrahydrofuran was added. The mixture was refluxed for 40 minutes and stirred at room temperature for an additional hour. Dry carbon dioxide was bubbled through the reaction mixture overnight. The tetrahydrofuran was blown off with a strong stream of carbon dioxide, and water was added to decompose the Grignard reagent. The aqueous solution was extracted with ethyl acetate and the aqueous layer was treated with 2.5 N hydrochloric acid until acidic. The acidic aqueous solution was extracted four times with benzene, and the benzene extract was washed with water until neutral and then discarded. The wash water was combined with the acidic aqueous solution, which was extracted twice with ethyl acetate. The ethyl acetate was washed with water until neutral and dried over anhydrous sodium sulfate and concentrated to dryness. The product obtained was 3-(3α,11β,17β-trihydroxy - 16α-methyletiocholan-17α-yl)-2-propynoic acid (IV). The product was recrystallized from ether. M.P. 198°–211°C. (decomposes).

$\lambda_{max.}^{Nujol}$ 2.8μ, 4.40μ, 5.84μ; $\lambda_{max.}^{Morpholine}$ 2.81μ, 4.50μ, 6.35μ

These infra-red spectra indicate that reduction took place at the 11 position.

*Analysis.*—Calculated: C, 70.74%; H, 8.78%. Observed: C, 70.33%; H, 8.67%.

EXAMPLE 4

*3-(3α,11β,17β-Trihydroxy-16α-Methyletiocholan-17α-Yl)Propionic Acid Gamma-Lactone*

The 3-(3α,11β,17β-trihydroxy - 16α - methyletiocholan-17α-yl)-2-propynoic acid (IV), obtained in Example 3, was dissolved in 160 ml. of methanol and catalytically hydrogenated at a pressure of 40 lbs. per square inch in the presence of 1.6 g. of palladium oxide catalyst. The reaction product was filtered and concentrated. Upon the addition of ether the product 3-(3α,11β,17β-trihydroxy-16α-methyletiocholan-17α-yl)propionic acid gamma-lactone (V) was obtained. This compound has a double melting point at 140°–142° C. and 195°–198° C.

$\lambda_{max.}^{Nujol}$ 2.81μ, 5.61μ

*Analysis.*—Calculated: C, 73.36% H, 9.64%. Observed: C, 72.83%; H, 9.59%.

EXAMPLE 5

*3-(17β-Hydroxy-16α-Methyl-3,11-Dioxoetiocholan-17α-Yl)Propionic Acid Gamma-Lactone*

To 100 mg. of 3-(3α,11β,17β-trihydroxy-16α-methyletiocholan-17α-yl)propionic acid gamma-lactone (V) in 1.6 ml. in glacial acetic acid was added 100 mg. of chromic anhydride in 3.0 ml. of 90% acetic acid. The reaction mixture was stirred for 80 minutes at room temperature. The reaction mixture was diluted with four volumes of water and the solution was extracted with ethyl acetate. The ethyl acetate extract was washed with sodium bicarbonate and then with water until neutral, dried over anhydrous sodium sulfate, and concentrated to obtain the product 3-(17β - hydroxy - 16α - methyl - 3,11-dioxoetiocholan-17α-yl)propionic acid gamma-lactone (VI). Yeld 80 mg.; M.P. 218°–222° C.

$\lambda_{max.}^{Nujol}$ 5.65μ, 5.89μ

Analysis.—Calculated: C, 74.16%; H, 8.66%. Found: C, 73.52%; H, 8.75%.

EXAMPLE 6

*3-(4-Bromo-17β-Hydroxy-16α-Methyl-3,11-Dioxoetiocholane-17α-Yl)Propionic Acid Gamma-Lactone*

To 90 mg. of 3-(17β-hydroxy-16α-methyl-3,11-dioxoetiocholan-17α-yl)propionic acid gamma-lactone (V), dissolved in 3 ml. of dimethylformamide was added 2.2 ml. of a solution containing 18 mg. of bromine per milliliter of dimethylformamide, and about 5 mg. of p-toluenesulfonic acid. The solution was allowed to stand at room temperature until the bromine color disappeared, which required about three and one-half hours. The reaction mixture was then diluted with 40 ml. of ether and extracted with four 10-ml. portions of water. The ether solution was then dried and then evaporated. The product, 3-(4-bromo-17β-hydroxy-16α-methyl-3,11-dioxoetiocholan-17α-yl)propionic acid gamma-lactone (VII), was crystallized from methylenechloride-ether. M.P. 240°–245° C. (decomposes).

EXAMPLE 7

*3-(17β-Hydroxy-16α-Methyl-11-Oxo-3-Semicarbazido-4-Androsten-17α-Yl)Propionic Acid Gamma-Lactone*

Fifty milligrams of 3-(4-bromo-17β-hydroxy-17α-methyl-3,11-dioxoetiocholan-17α-yl)propionic acid gamma-lactone (VIII), 11 mg. of semicarbazide hydrochloride and 19 ml. of semicarbazide free base were mixed thoroughly in a flask which was purged with nitrogen. To the mixture was added 1.5 ml. of dimethylformamide. The solution turned yellow almost immediately. The reaction mixture was stirred at room temperature for two and one-half hours. The reaction mixture was then diluted with about 20 ml. of water and extracted with ethyl acetate. The ethyl acetate extracts were washed with water, dried over anhydrous sodium sulfate, and evaporated to dryness under reduced pressure. The product 3-(17β-hydroxy-16α-methyl-11-oxo-3-semicarbazido-4-androsten-17α-yl)propionic acid gamma-lactone (VIII) was crystallized from methylene chloride-ether. M.P. 245°–265° C. (decomposed);

$\lambda_{max.}^{CHCl_3}$ 271 mμ; $E_{mol}$ 25,200

EXAMPLE 8

*3-(17β-Hydroxy-16α-Methyl-3,11-Dioxo-4-Androsten-17α-Yl)Propionic Acid Gamma-Lactone*

A solution of 40 mg. of 3-(17β-hydroxy-16α-methyl-11-oxo-3-semicarbazido-4-androsten-17α-yl)propionic acid gamma-lactone (VIII) in 0.5 ml. of pyruvic acid, 0.5 ml. of acetic acid, and 0.5 ml. of water was prepared. The reaction mixture was allowed to stand at room temperature for 16 hours and then diluted with 20 ml. of water and extracted with ethyl acetate. The extracts were washed with water, sodium bicarbonate solution and again with water, and dried over anhydrous sodium sulfate. Evaporation under reduced pressure resulted in 35 mg. of crude product of 3-(17β-hydroxy-16α-methyl-3,11-dioxo-4-androsten-17α-yl)propionic acid gamma-lactone (IX). The crude product was recrystallized from methylene chloride-ether. M.P. 237°–244° C.;

$\lambda_{max.}^{CH_3OH}$ 238 mμ; $E_{mol}$ 13,400

EXAMPLE 9

*3-(11β,17β-Dihydroxy-16α-Methyl-3-Semicarbazido-4-Androsten-17α-Yl)Propionic Acid Gamma-Lactone*

To a solution of 150 mg. of 3-(17β-hydroxy-16α-methyl-11-oxo-3-semicarbazido-4-androsten-17α-yl)propionic acid gamma-lactone (VIII) in 15 ml. of tetrahydrofuran is added, with stirring, 60 mg. of sodium borohydride. The reaction mixture was stirred at room temperature for 16 hours. Dilute hydrochloric acid was added until the solution was slightly acid. The resultant solution was extracted with ethyl acetate, and the extracts washed with water, dried and evaporated under reduced pressure. The resulting residue was taken up in methanol and concentrated. Methylene chloride and ether were added; and the product 3-(11β,17β-hydroxy-16α-methyl-3-semicarbazido-4-androsten-17α-yl)propionic acid gamma-lactone (X) precipitated out and collected. M.P. 250°–280° C. (decomposes);

$\lambda_{max.}^{CH_3OH}$ 268, E% 552

EXAMPLE 10

*3-(11β,17α-Dihydroxy-16α-Methyl-3-Oxo-4-Androsten-17α-Yl)Propionic Acid Gamma-Lactone*

One hundred and forty-five milligrams of 3-(11β, 17β-dihydroxy-16α-methyl-3-semicarbazido-4-androsten-17α-yl)-propionic acid gamma-lactone (X), 1.5 ml. of 98% pyruvic acid, 1.5 ml. of glacial acetic acid, and 1.5 ml. of water are mixed at room temperature. The reaction mixture allowed to stand at room temperature for 16 hours, diluted with about 30 ml. of water, and extracted with ethyl acetate. The extracts were washed with saturated sodium bicarbonate solution and water and dried over sodium sulfate. Removal of the solvent resulted in crystallization of 3-(11β,17α-dihydroxy-16α-methyl-3-oxo-4-androsten-17α-yl)propionic acid gamma-lactone (XI). The product is recrystallized from methylene chloride-ether. M.P. 251°–258° C.

Analysis.—Calculated for $C_{23}H_{32}O_4$: C, 74.16%; H, 8.66%. Observed: C, 74.21%; H, 72%.

EXAMPLE 11

*3[17β-Hydroxy-16α-Methyl-3-Oxo-4,9(11)Androstadien-17α-Yl]Propionic Acid Gamma-Lactone*

To a solution of 100 mg. of 3-(11β,17β-dihydroxy-16α-methyl-3-oxo-4-androsten-17α-yl)propionic acid gamma-lactone (XI) in 4.8 ml. of dimethylformamide was added 0.8 ml. of pyridine and 0.4 ml. of methanesulfonyl chloride. The reaction mixture was heated at 80° to 85° C. for one hour. The solution became red in color after about 15 minutes and almost black by the end of the hour. The reaction mixture was poured into about 10 ml. of ice water, and extracted with ethyl acetate. The extract was washed with water, dilute hydrochloric acid, saturated aqueous sodium bicarbonate and water again, and dried over anhydrous sodium sulfate. The solution was evaporated, leaving a red oil. This oil was acid-washed alumina. The alumina was eluted with ether and the product 3-[17β-hydroxy-16α-methyl-3-oxo-4,9(11)-androstadien-17α-yl]propionic acid gamma-lactone (XII) was crystallized from ether. M.P. 181°–185° C. Repeated recrystallization from ether yielded an analytical sample; M.P. 188° to 191° C.;

$\lambda_{max.}^{CH_3OH}$ 239 mμ; $E_{mol}$ 16,700

Analysis.—Calculated for $C_{23}H_{30}O_3$: C, 77.93%, H, 8.53%. Found: C, 78.18%; H, 8.46%.

EXAMPLE 12

*3-(9α-Bromo-11β,17β-Dihydroxy-16α-Methyl-3-Oxo-4-Androsten-17α-Yl)Propionic Acid Gamma-Lactone*

One hundred and forty milligrams of 3-[17β-hydroxy-16α-methyl-3-oxo-4,9(11)androstadien-17α-yl]propionic acid gamma-lactone (XII) was dissolved in 2 ml. of acetone and cooled with stirring to 0° C. To this solution were added 109 mg. of N-bromosuccinimide and 0.4 ml. of aqueous perchloric acid, prepared by diluting 0.32 ml. of 60% perchloric acid with 16 ml. of water. After about five minutes at 0° C. a precipitate formed in the reaction flask. Stirring was continued at 0° C. for two hours. The precipitate was separated by filtration, washed with cold acetone and cold ether and dried. The crude product weighed 116 mg. and had a melting point of 202°–206° C. (decomposes). Extraction of the mother liquors with methylene chloride, followed by evaporation yielded a second crop. M.P. 201°–205° C. A sample of the product 3-(9α-bromo-11β,17β-dihydroxy-16α - methyl - 3-oxo-4-androsten-17α-yl)propionic acid gamma-lactone (XIII) was recrystallized for analysis from acetone. M.P. 204°–206° C. (decomposes).

$\lambda_{max.}^{CH_3OH}$ 243 m$\mu$; E$_{mol}$ 16,200

*Analysis.*—Calculated for $C_{23}H_{31}O_4Br$: C, 61.20%; H, 6.93%. Found: C, 61.27%; H, 6.92%.

EXAMPLE 13

*3-(9β,11β-Epoxy-17β-Hydroxy-16α-Methyl-3-Oxo-4-Androsten-17α-Yl)Propionic Acid Gamma-Lactone*

To a suspension of 100 mg. of 3-(9α-bromo-11β,17β-dihydroxy - 16α - methyl - 3 - oxo-4-androsten-17α-yl) propionic acid gamma-lactone (XIII) in 8 ml. of tetrahydrofuran was added 187 mg. of potassium carbonate in 3.25 ml. of water. The reaction mixture was stirred at room temperature for about 16 hours, and was then extracted with three 50-ml. portions of ethyl acetate. The extracts were combined, washed with water until the washings were neutral, dried over anhydrous sodium sulfate, and evaporated to dryness under reduced pressure, resulting in 87 mg. of crude product. Upon trituration with ether, the product 3-(9β,11β-epoxy-17β-hydroxy-16α - methyl - 3-oxo-4-androsten-17α-yl)propionic acid gamma-lactone (XIV) crystallized and was separated by filtration. M.P. 198°–206° C. A sample was recrystallized for analysis from ether-methylene chloride. M.P. 211°–213° C.

$\lambda_{max.}^{CH_3OH}$ 243 m$\mu$; E$_{mol}$ 14,320

*Analysis.*—Calculated for $C_{23}H_{30}O_4$: C, 74.56%; H, 8.16%. Found: C, 74.38%; H, 8.22%.

EXAMPLE 14

*3-(9α-Fluoro-11β,17β-Dihydroxy-16α-Methyl-3-Oxo-4 Androsten-17α-Yl)Propionic Acid Gamma-Lactone*

A solution of 50 mg. of 3-(9β,11β-epoxy-17β-hydroxy-16α - methyl - 3 - oxo - 4 - androsten - 17α - yl)propionic acid gamma-lactone (XIV) in 2 ml. of chloroform was added to 2 ml. of a solution prepared by mixing 7.45 ml. of a 6% (by weight) solution of hydrogen fluoride in tetrahydrofuran with 5 ml. of tetrahydrofuran and 3.75 ml. of chloroform. The reaction mixture was cooled to −40° C., allowed to stand at this temperature for four hours, and then poured into a mixture of 8 g. of potassium carbonate in 15 g. of ice water and 15 ml. of chloroform. The chloroform layer was separated and the aqueous layer was washed with two 15-ml. portions of chloroform. The chloroform extracts were combined and washed with water until the washings were neutral. The solution was dried over anhydrous sodium sulfate and evaporated to dryness. The product 3-(9α-fluoro-11β,17β-dihydroxy-16α - methyl - 3 - oxo - 4-androsten-17α-yl)propionic acid gamma-lactone (XV) was taken up in acetone, concentrated and crystallized out upon cooling. Yield 30 mg. M.P. 298°–305° C. (decomposes). A sample was recrystallized for analysis from acetone. M.P. 303°–306° C. (placed on Kofler hot stage at 270° C.).

$\lambda_{max.}^{CH_3OH}$ 2,380; E$_{mol}$ 16,770

*Analysis.*—Calculated for $C_{23}H_{31}O_4F$: C, 70.75%; H, 8.00%; F, 4.86%. Found: C, 70.71%; H, 7.87%; F, 4.90%.

EXAMPLE 15

*3-(17β - Hydroxy-16α - Methyl-3,11-Dioxo-1,4-Androstadien-17α-Yl)Propionic Acid Gamma-Lactone*

To a solution of 100 mg. of 3-(17β-hydroxy-16α-methyl-3,11-dioxo-4-androsten-17α-yl)propionic acid gamma-lactone (IX) in 2 ml. of tert.-butanol are added 0.1 ml. of glacial acetic acid, 100 mg. of mercury, and 74 mg. of selenium dioxide in 3.3 ml. of tert.-butanol. The reaction mixture is stirred at room temperature for sixteen hours and then filtered. The filtrate is diluted with about 20 ml. of ethyl acetate and extracted with 20–24% aqueous ammonium sulfide solution saturated aqueous sodium bicarbonate, and 2.5 N hydrochloric acid, and water, and dried over anhydrous sodium sulfate. Removal of the drying agent and solvents results in 3-(17β-hydroxy-16α-methyl-3,11-dioxo-1,4-androstadien-17α-yl)propionic acid gamma-lactone (XVII).

EXAMPLE 16

*3-(11β,17β-Dihydroxy-16α-Methyl-3-Oxo-1,4-Androstadien-17α-Yl)Propionic Acid Gamma-Lactone*

A solution of 100 mg. of 3-(17β-hydroxy-16α-methyl-3,11 - dioxo - 1,4 - androstadien - 17α - yl)propionic acid gamma-lactone (XVII) in 2.7 ml. of tetrahydrofuran is cooled to 0° C. To this solution is added with stirring 0.8 ml. of an aqueous solution of sodium borohydride containing 17.5 mg. of sodium borohydride per milliliter. The reaction mixture is stirred at 0° C. for three hours, dilute hydrochloric acid is then added, and the solution is extracted with ethyl acetate. The extracts are washed with water, dried, and evaporated. Crystallization from methylene chloride-ether results in the product 3-(11β, 17β-dihydroxy-16α-methyl - 3 - oxo-1,4-androstadien-17α-yl)propionic gamma-lactone (XVIII).

What is claimed is:

3-(17β-hydroxy-16α-methyl-3,11-dioxo - 4 - androsten-17α-yl)propionic acid gamma-lactone.

References Cited in the file of this patent

UNITED STATES PATENTS

| | | |
|---|---|---|
| 2,705,712 | Cella | Apr. 5, 1955 |
| 2,875,199 | Cella | Feb. 24, 1959 |
| 2,925,416 | Brown et al. | Feb. 16, 1960 |

OTHER REFERENCES

Marker et al.: J.A.C.S., 64, 1280 (1942).